United States Patent [19]

Luecke

[11] Patent Number: 4,633,456

[45] Date of Patent: Dec. 30, 1986

[54] TWO AXIS ELECTROMAGNETIC ACTUATOR

[75] Inventor: Francis S. Luecke, Byron, Minn.

[73] Assignee: International Business Machines Corporation, Armonk, N.Y.

[21] Appl. No.: 573,166

[22] Filed: Jan. 23, 1984

[51] Int. Cl.⁴ .................................................. G11B 7/08
[52] U.S. Cl. ......................................... 369/45; 250/201
[58] Field of Search ............. 369/44, 45; 250/201 DF

[56] References Cited

U.S. PATENT DOCUMENTS 4,321,701  3/1982  Arguie et al. ........................... 369/45

FOREIGN PATENT DOCUMENTS

| 0012650 | 6/1980 | European Pat. Off. |
| 0053476 | 9/1982 | European Pat. Off. |
| 0088010 | 9/1983 | European Pat. Off. |
| 2091902 | 8/1982 | United Kingdom |
| 2097151 | 10/1982 | United Kingdom |
| 2132034 | 6/1984 | United Kingdom |

*Primary Examiner*—Aristotelis M. Psitos
*Attorney, Agent, or Firm*—Homer L. Knearl

[57] ABSTRACT

A two axis electromagnetic actuator having balanced crossed coil structures supported by two sets of leaf springs and positioned in dual air gaps for motion in a direction representing the vector sum of the movement in two orthogonal directions.

7 Claims, 6 Drawing Figures

TWO AXIS ELECTROMAGNETIC ACTUATOR

FIELD OF THE INVENTION

This invention relates to electromagnetic actuators and more particularly to a two axis electromagnetic actuator for use in a data storage system.

DESCRIPTION OF THE PRIOR ART

Electromagnetic actuators are used in data storage systems to access a desired track on an information bearing medium and then follow it with the required accuracy.

For example, optical data storage systems use a laser to generate a beam of radiation. The beam is directed by beam guiding means onto a rotating disk having information to be recorded or previously recorded on a spiral or circular track by means of pits or holes in the media.

Such systems need to have a fast access to the track either for writing information at a predetermined point of the track or for reading written information at any point of the track.

Once the laser beam is correctly positioned with respect to the spiral or circular track on the disk the beam guiding means has to be vertically positioned so that the laser beam remains correctly focused on the disk.

Such systems are more completely described in the article: "Optical Data Storage Technology Status And Prospects" by A. E. Bell, Computer Design, January 1983, pages 133-146.

In the prior art, access to the track or radial position control of the laser beam guiding means is usually accomplished by mechanical means which operates to provide a relative displacement of the beam guiding means and the disk. Focusing or vertical position control is obtained by means of an electromagnetic coil which moves an optical element.

The device described in U.S. Pat. No. 4,321,701 for track accessing and laser beam focusing has electromagnetic coils for vertical and radial movement of the read/write head positioned in the same air gap.

This system requires that close tolerance be maintained for the air gap and electromagnetic coils to reduce friction, necessitating a special treatment that adds to the cost and complicates the mounting and alignment.

SUMMARY OF THE INVENTION

The principal object of the invention is to provide an electromagnetic actuator which is capable of motion along two axes with a minimum of mass and parts.

Another object of the invention is to provide an electromagnetic actuator which is capable of high speed motion along two orthogonal axes without requiring a precision mounting of the components of the magnetic circuit or high power input.

A further object of the invention is to provide an optical data storage system comprising a two axis electromagnetic actuator for moving an optical component in a manner to provide for accessing a track on an optical storage disk having information to be recorded or recorded onto it and for focusing the read/write optical beam on said track.

These objects are accomplished by including in the actuator a balanced magnetic structure with two air gaps in which two moving coils are positioned. The moving coils are supported by two sets of parallel leaf springs allowing movement in two orthogonal directions. Simultaneous energization of both coils results in a motion which is the vector sum of the movements in said two orthogonal directions.

DESCRIPTION

Figure 1:
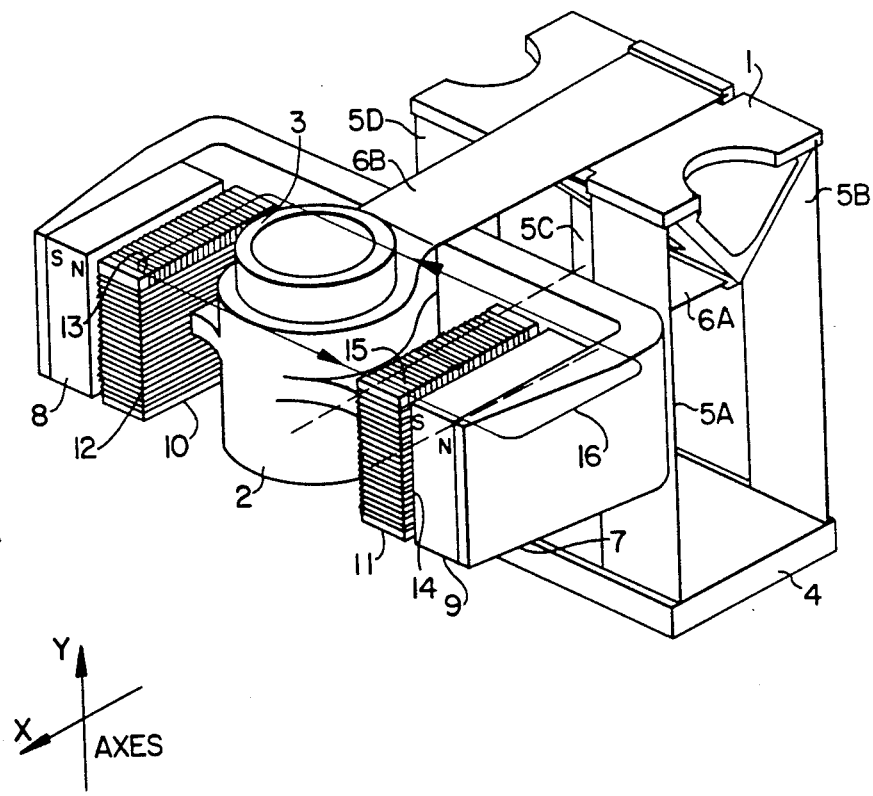
FIG. 1 is an isometric view of a two axis electromagnetic actuator according to the invention.

FIG. 1 shows a two axis electromagnetic actuator capable of a finely controlled motion along the X and Y axes. As used in an optical data storage system, the motion along the X axis provides access to the desired radial data track and motion along the Y axis is for the purpose of accommodating movement of the disk which would tend to throw the system out of focus.

The actuator of FIG. 1 comprises a spring carrier 1 and an armature 2. Armature 2 can carry an optical element, such as a mirror, prism or an objective lens 3 set for use with the read/write head of an optical data storage system as described in the article by A. E. Bell.

Carrier 1 is attached to a base plate 4 by a first set of parallel leaf springs 5A, 5B, 5C, 5D extending perpendicularly to base plate 4 thereby allowing carrier 1 to move along the X axis in a fashion to place objective lens 3 in the correct radial position. Armature 2 is attached to carrier 1 by a second set of parallel leaf springs 6A, 6B extending parallel to base plate 4, thereby allowing armature 2 to move along the Y axis in a fashion to focus the system by positioning the objective lens. Springs 5A, 5B, 5C, 5D and 6A, 6B allow armature 2 to move freely in the X-Y plane but prevent motion in any other direction. Armature 2 is part of a magnetic flux circuit which includes a yoke 7, two permanent magnets 8 and 9 and two pole pieces 10 and 11.

Two coils 12, 13 are wound around pole piece 10 in such a way that both are disposed at right angle to each other, corresponding to the X and Y directions, respectively, in an overlaying relationship in a small gap existing between armature 2 and pole piece 10.

Similarly, two coils 14, 15 are wound around pole piece 11 in such a way that both are disposed at right angle to each other, corresponding to the X and Y directions, respectively, in overlaying relationship in a small gap existing between armature 2 and pole piece 11. Permanent magnets 8, 9 and pole pieces 10, 11 with their respective coils 12, 13 and 14, 15 are fixed to the ends of yoke 7. The resulting structure provides a small air gap between the outer ends of armature 2 and the interior, facing portions, of coils 12, 13 and 14, 15. This air gap allows armature 2 to move freely along a first, or X axis and a second, or Y axis.

The magnetic flux path in the magnetic circuit is shown by arrow 16.

When a current is applied to coils 12 and 14 the magnetic flux path is distorted in such a manner as to produce a force perpendicular to the direction of coils 12 and 14. This force acts on armature 2 and consequently will move it along the Y axis.

Similarly, when a current is applied to coils 13 and 15 the magnetic flux path is distorted in such a manner as to produce a force perpendicular to the direction of coils 13 and 15. This force acts on armature 2 and consequently will move it along the X axis.

Distance and direction of motion along the X and Y axes will be proportional to amplitude and polarity of current through coils 12-15. Accordingly, radial and vertical positioning of objective lens 3 can be obtained by applying to coils 12-15 currents of appropriate amplitudes and polarities.

Figure 2:
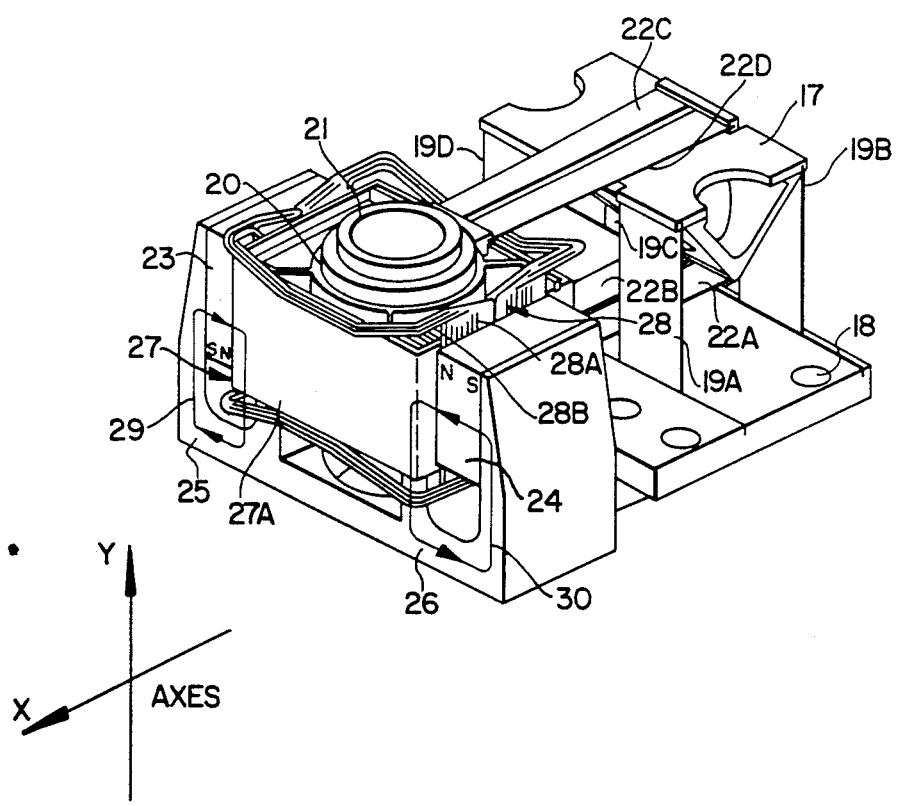
FIG. 2 is an isometric view of a preferred embodiment of a two axis electromagnetic actuator according to the invention.
Figure 3:
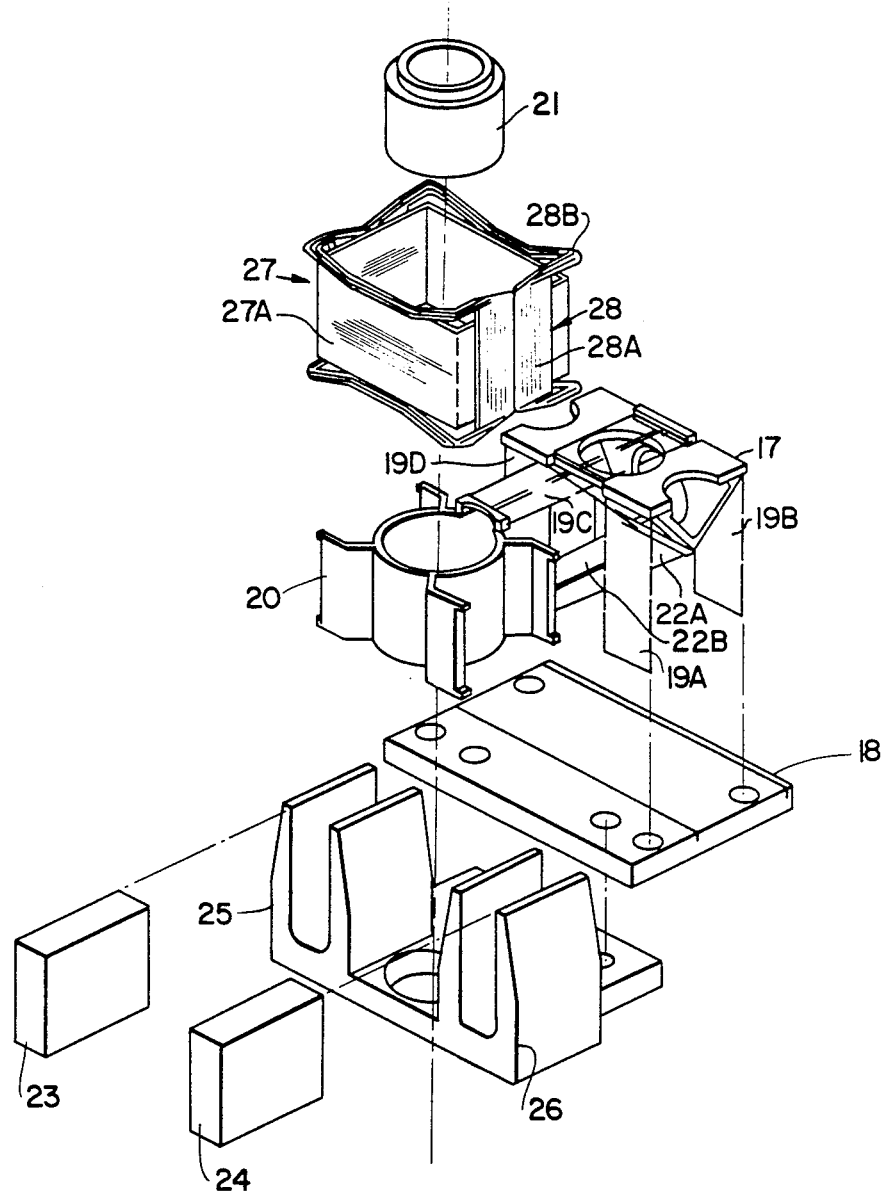
FIG. 3 is an exploded view of the electromagnetic actuator of FIG. 2.

FIGS. 2 and 3 show an embodiment of the two axis electromagnetic actuator in which the coils are wound in a fashion to pass through two air gaps without the need for pole pieces of magnetic material 10 and 11 according to the invention.

Carrier 17 is attached to base plate 18 by a first set of parallel leaf springs 19A, 19B, 19C, 19D extending perpendicularly to base plate 18 thereby allowing carrier 17 to move along the X axis. Armature 20 carrying objective lens 21 is attached to carrier 17 by a second set of parallel leaf springs 22A, 22B, 22C, 22D extending parallel to base plate 18 thereby allowing armature 20 to move along the Y axis. Springs 19A, 19B, 19C, 19D and 22A, 22B, 22C, 22D allow armature 20 to move in the X-Y plane, but prevent motion in any other direction.

Two magnetic flux circuits are formed by permanent magnets 23, 24 and yokes 25, 26 defining two air gaps.

Coil 27 is wound around armature 20 in a generally circular fashion so that the individual conductors form a thin web 27A and are oriented along the X axis in the region of the air gaps.

Figure 4:
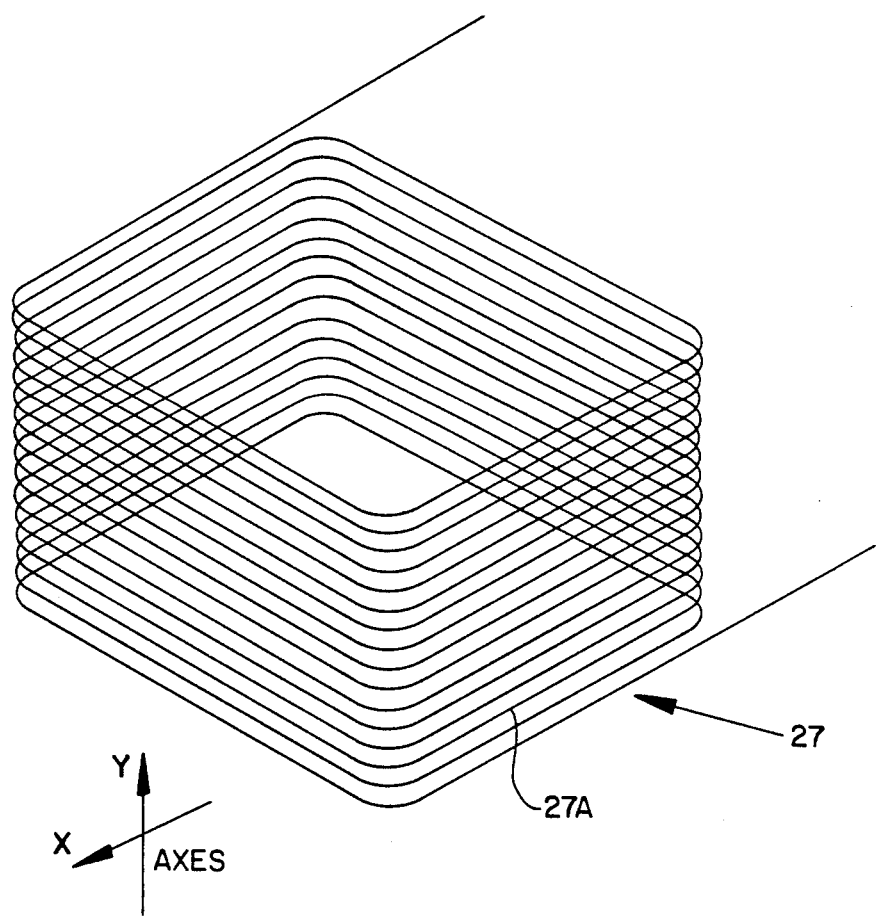
FIG. 4 and FIG. 5 are views of the layout of the coils of the electromagnetic actuator of FIG. 2.
Figure 5:
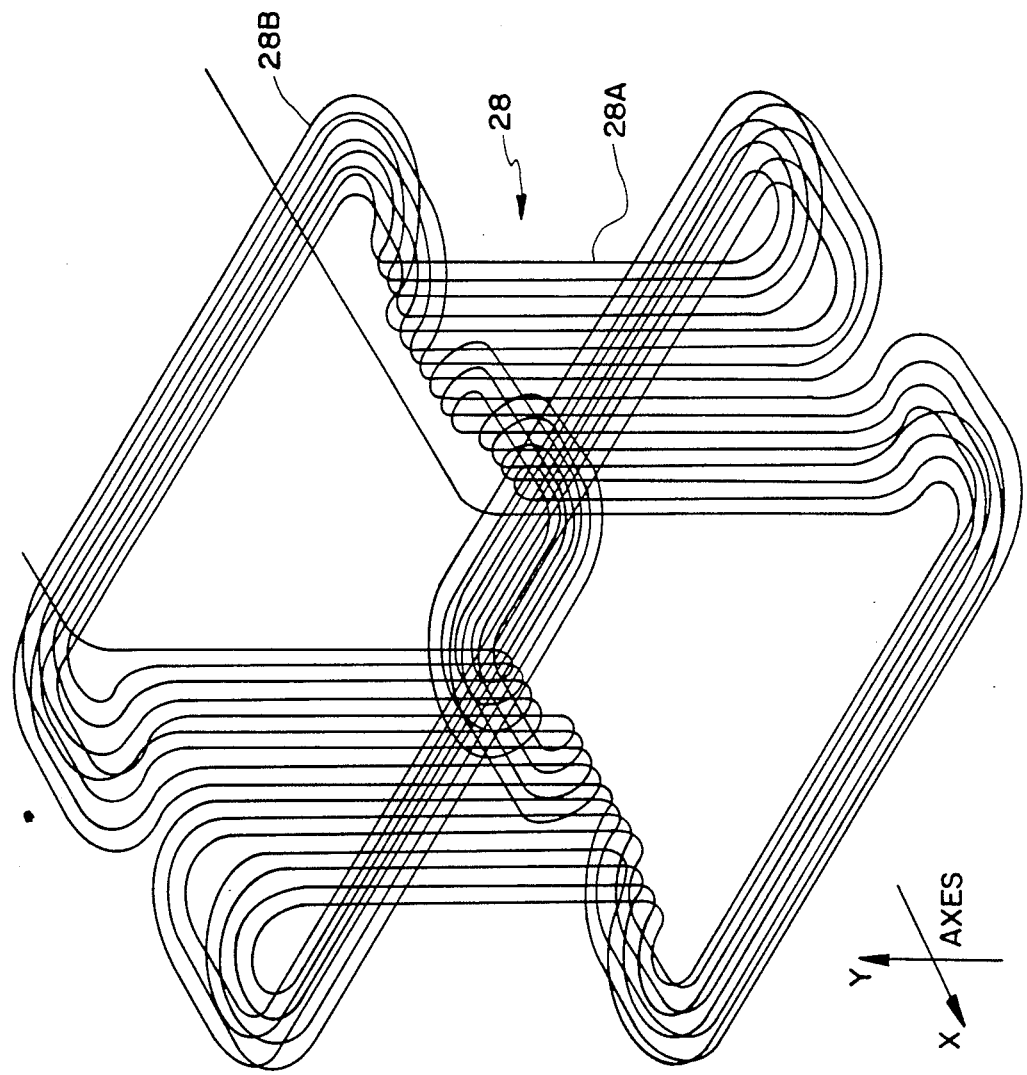

Coil 28 is wound around armature 20 in such a way that the individual conductors form a thin web 28A and are oriented along the Y axis in the region of the air gaps. Outside of the air gap the wires leave web 28A and are to form bundles 28B. FIGS. 4 and 5 represent the layout of coils 27 and 28, respectively. If made of conductive material parallel leaf spring sets 19A, 19B, 19C, 19D and 22A, 22B, 22C, 22D may be used to conduct current from the base plate 18 to coils 27 and 28 by appropriate insulation, termination and connections across carrier 17.

The magnetic flux paths across the two magnetic circuits are shown by arrows 29 and 30. When a current is applied to coil 27 the magnetic flux path is distorted in such a manner as to produce a force perpendicular to the direction of coil 27 in a direction dependent on the polarity of the current. This force acts on armature 20 and consequently will move it along the Y axis.

Similarly, when a current is applied to coil 28 the magnetic flux path is distorted in such a manner as to produce a force perpendicular to the direction of coil 28. This force acts on armature 20 and consequently will move it along the X axis in a direction dependent on the polarity of the current.

Distance and direction of motion along the X and Y axes is proportional to amplitude and polarity of current through coils 27, 28. Accordingly, radial and vertical positioning of objective lens 21 can be obtained by applying to coils 27, 28 currents of appropriate amplitudes and polarities.

It will be appreciated that the movement is the vector sum of the simultaneous motion along the X and Y axes. There is no need to wait until movement along one axis is complete before initiating movement along the other.

In the usual case, the magnitude and polarity of the drive coil current will be controlled according to signals indicating the focus and track positioning errors. Means for developing such signals are well known.

The coil winding geometry shown in FIGS. 4 and 5 overcomes the requirement for a large area for the coils which would be typical for example of a flat printed circuit coil set, as described, for example in U.S. Pat. No. 4,321,701.

When this device is constructed for high speed operation, it is possible that mechanical resonance may occur within the band of operating frequency. Further, high speed operation may require coil drive currents that tend to heat the device. Damping of unwanted resonances and reduction of heat buildup in the coils can be accomplished by introducing a magnetic damping fluid in the air gaps, where it is retained by the magnetic flux.

Figure 6:
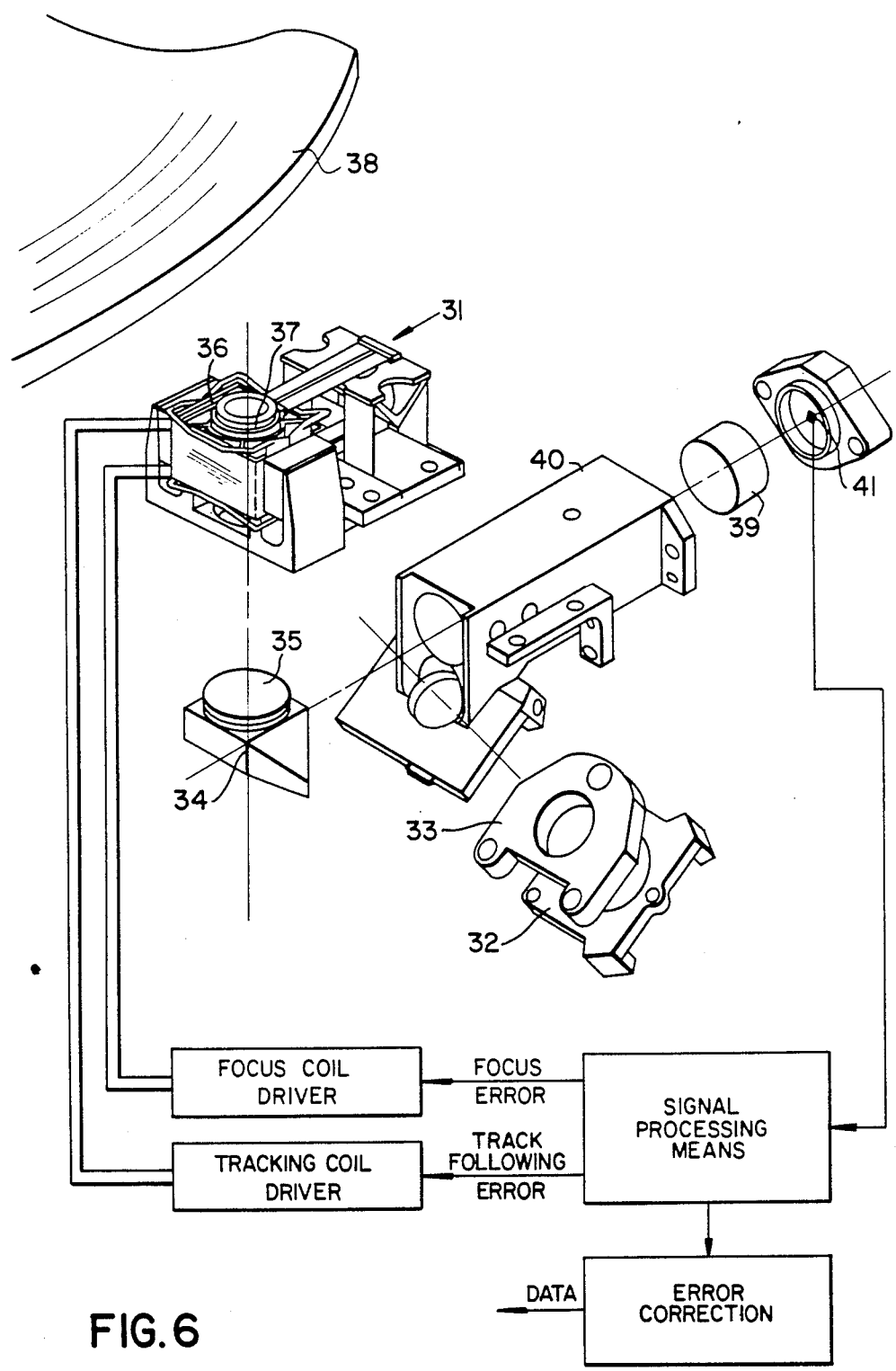
FIG. 6 is an exploded view of an optical read/write head of an optical data storage system embodying a two axis electromagnetic actuator according to the invention.

FIG. 6 shows an optical read/write head embodying a two axis electromagnetic actuator 31.

A laser 32, for example a semiconductor laser, typically emitting a coherent beam of light about 800 nm, is driven according to a data pattern. The polarized laser beam is collimated by a collimating lens 33 and enters a polarizing beam splitter 34. The polarized beam passes through polarizing beam splitter 34 and a quarter wave plate 35 which circularly polarizes the beam and passes it to objective lens 36 fixed to the armature 37 of actuator 31 which focuses the beam onto optical disk 38. The beam reflected from optical disk 38 is collimated by objective lens 36 and passes through quarter wave plate 35 where its polarization is restored to planar, rotated by 90° from the original. As the polarization of the beam has been rotated by 90° it is now reflected by polarizing beam splitter 34 through focusing lens 39 mounted into housing 40 to photodetector 41. Typically, photodetector 41 is a quadrant type detector generating data signals and track and focus servo signals.

These track and focus servo signals are applied to track control and focus control circuits, as described in the article by A. E. Bell, to determine the amplitude and the polarity of the current applied to actuator 31.

What is claimed is:
1. A two axis electromagnetic actuator comprising:
a movable armature,
first and second yokes,
first and second permanent magnets fixed to one extension of each of said first and second yokes, producing two uniform magnetic flux fields of opposite directions across a first and a second air gap,
a first coil wound around said movable armature in a generally circular fashion so that the individual conductors form a thin web oriented along a first axis and a portion of which intersects substantially all of the flux field area in the region of said first and second air gaps,
a second coil wound around said movable armature in such a way that the individual conductors form a second web oriented along a second axis, which is perpendicular to and lies within a plane common to said first axis, said second thin web intersects substantially all of the flux field area in the region of said first and second air gaps, a spring carrier, first spring support means fixed to said armature and said carrier and oriented to flex only in a direction to permit motion of said armature within said air gaps along a first axis, second spring support means fixed to said carrier and a base member and oriented to flex only in a direction to permit motion of said carrier and said armature within said air gaps along a second axis which is perpendicular and lies within a plane common to said first axis, and said first and second spring support means oriented relative to each other so that flexure of one spring support means places flexure stress on the other spring support means only in its direction of flexure.

2. A two axis actuator according to claim 1 wherein a current is applied to said first coil to distort the flux path in a first direction thereby producing a force on said armature and said coil moving them along said first axis.

3. A two axis actuator according to claim 2 wherein a current is applied to said second coil to distort the flux path in a second direction thereby producing a force on said armature and said coil moving them along said second axis.

4. A two axis actuator according to claim 2 or 3 wherein the distance and direction of armature motion is responsive to the amplitude and polarity of said applied currents.

5. A two axis actuator according to any one of claims 1-4 wherein the air gaps contain a magnetic damping fluid.

6. The actuator or claim 3 for displacing an optical element for deflecting and/or focusing a beam of radiation impinging on a moving optical storage medium in an optical data storage system wherein:

said movable armature carries said optical element.

7. An actuator according to claim 6 wherein the amplitude and the polarity of the current applied to said coils is determined by track and focus control circuits.

* * * * *